(12) United States Patent
Hoffman (10) Patent No.: US 7,712,783 B2
(45) Date of Patent: May 11, 2010

(54) MODULAR COLUMN MOUNT

(75) Inventor: Lawrence Andrew Hoffman, Portland, OR (US)

(73) Assignee: The Hoffman Group Int'l, Ltd, Tortola (VG)

( * ) Notice: Subject to any disclaimer, the term of this patent is extended or adjusted under 35 U.S.C. 154(b) by 202 days.

(21) Appl. No.: 11/869,653

(22) Filed: Oct. 9, 2007

(65) Prior Publication Data

US 2008/0085152 A1    Apr. 10, 2008

Related U.S. Application Data

(60) Provisional application No. 60/828,382, filed on Oct. 6, 2006.

(51) Int. Cl.
*B62D 1/16* (2006.01)
*B62D 1/02* (2006.01)

(52) U.S. Cl. .................. 280/780; 280/779; 74/492; 403/332

(58) Field of Classification Search .................. 280/779, 280/780; 74/492; 403/332
See application file for complete search history.

(56) References Cited

U.S. PATENT DOCUMENTS

| | | | | |
|---|---|---|---|---|
| 1,483,903 A * | 2/1924 | Masury | ...................... | 280/780 |
| 1,485,922 A * | 3/1924 | Higgins | ...................... | 280/779 |
| 1,675,610 A * | 7/1928 | Knudsen | ...................... | 280/779 |
| 1,802,004 A * | 4/1931 | Derr, Sr. | ...................... | 180/78 |
| 3,971,606 A * | 7/1976 | Nakano et al. | ................. | 384/97 |
| 4,895,391 A * | 1/1990 | Groat | .......................... | 280/779 |
| 7,182,169 B2 * | 2/2007 | Suzuki | ....................... | 180/426 |
| 2005/0167966 A1 * | 8/2005 | Fischer | ........................ | 280/779 |
| 2005/0284250 A1 * | 12/2005 | Suzuki | ........................ | 74/492 |

* cited by examiner

*Primary Examiner*—Paul N. Dickson
*Assistant Examiner*—Barry Gooden, Jr.
(74) *Attorney, Agent, or Firm*—Silicon Forest Patent Group; Paul J. Fordenbacher, Esq

(57) ABSTRACT

A modular column mount comprising a base fixture, a clamp float in engagement with the base fixture, and a first ring in engagement with the clamp float, the ring defining an aperture adapted to accept a steering column therethrough. The modular column mount further comprising at least one of a plurality of second rings of different predetermined inner and outer diameters used singularly or mixed and matched between the aperture of the first ring so as to provide various combinations providing a column mount of predetermined aperture size. The cost of manufacturing and inventory control of various first and second rings is substantially less than the cost of manufacturing and inventory control of column mounts of fixed aperture size in all the various aperture sizes that are possible and provided by the modular column mount.

8 Claims, 8 Drawing Sheets

MODULAR COLUMN MOUNT

RELATED APPLICATION

This application is a non-provisional application claiming the benefit of U.S. Provisional Application No. 60/828,382, filed Oct. 6, 2006, incorporated herein in its entirety by reference.

FIELD

The present invention is related to vehicle components, and more particularly, to steering column mounts.

BACKGROUND

Figure 1:
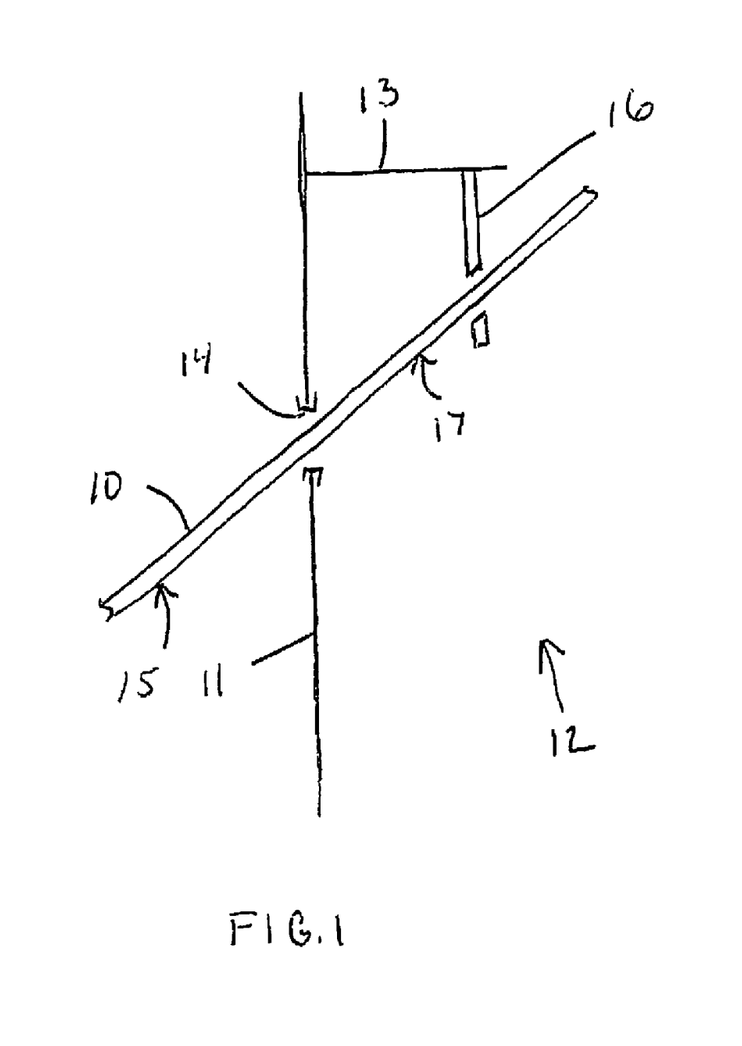
FIG. 1 is a side view of steering elements of a vehicle with a steering column mounted in a column mount.
Figure 2A:
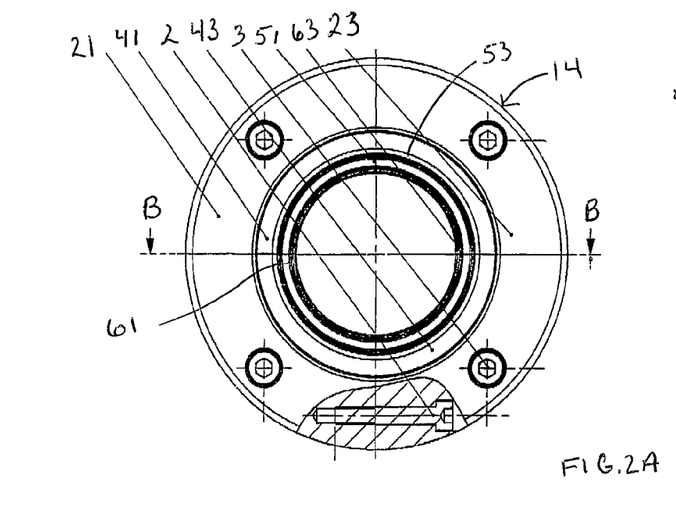
FIGS. 2A-E are plan, cross-sectional, side, top, and detail views of a column mount, in accordance with an embodiment.
Figure 2B:
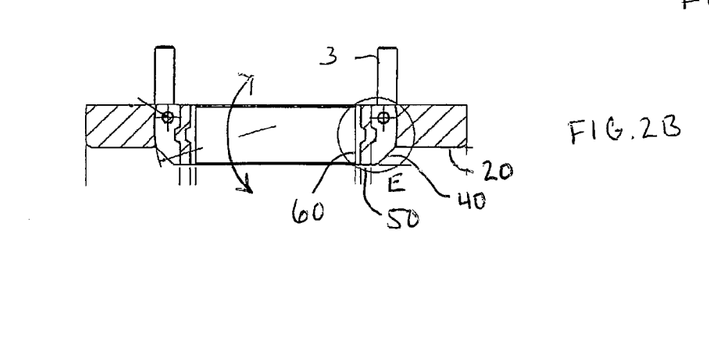
Figure 2C:
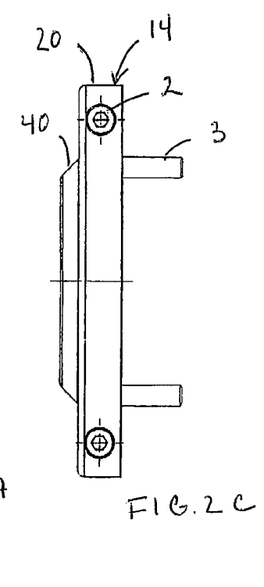
Figure 2D:
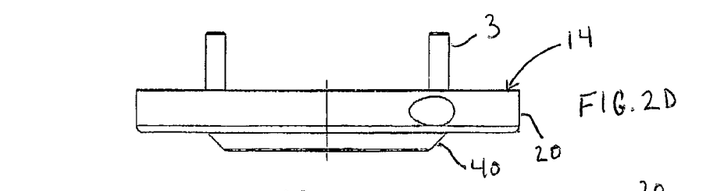
Figure 2E:
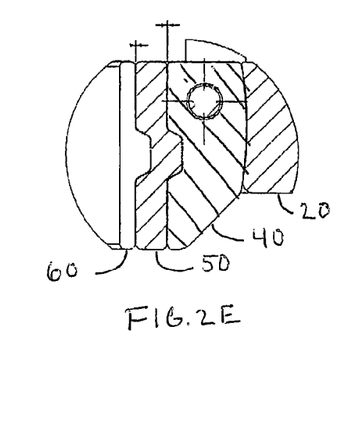

FIG. 1 is a side view of steering elements of a vehicle. Vehicles include a steering column 10 that provides steering control from the steering wheel (not shown). The steering column 10 is commonly supported in the passenger compartment 12 by a column mount 14 and a column drop 16. The column mount 14 is provided in the floor or firewall 11 of the vehicle and provides a through support for the steering column 10 as the lower portion 15 of the steering column 10 extends out of the passenger compartment 12. The column drop 16 is a bracket that supports the upper portion 17 of the steering column 10 and holds the steering column 10 at the desired angle to the passenger.

The column mount 14 is a generally ring-shaped element having an aperture having an inner diameter to accommodate and accept the outer diameter of the steering column 10. Manufacturers provide a limited selection of aperture sizes to accommodate the various diameters of available steering columns 10. The realities of inventory control and economics dictate that some suppliers and retailers provide a very limited number of aperture sizes that only accommodate a few of the many sizes of steering columns 10. Customers, particularly custom car enthusiasts that desire column mounts outside of the limited size availability are forced into either conforming to one of the stock sizes or having a column mount 14 of a custom size made which can be prohibitively expensive.

It would, therefore, be highly desirable to have a column mount that provides vehicle manufacturers, dealers, aftermarket, and custom vehicle enthusiasts many size and configuration options while minimizing inventory burdens and high costs.

BRIEF DESCRIPTION OF THE DRAWINGS

Like reference numbers generally indicate corresponding elements in the figures.

FIGS. 5A and 5B top and front views of a float first half of a clamp float in accordance with an embodiment;

FIGS. 5C and 5D top and front views of a float second half of a clamp float in accordance with an embodiment;

DETAILED DESCRIPTION

References will now be made to embodiments illustrated in the drawings and specific language which will be used to describe the same. It will nevertheless be understood that no limitation of the scope of the invention is thereby intended, such alterations and further modifications in the illustrated devices, as such further applications of the principles of the invention as illustrated therein as being contemplated as would normally occur to one skilled in the art to which the invention relates.

Embodiments in accordance with the present invention relate to providing a modular column mount 14 of various sizes while minimizing inventory burden. Further, embodiments in accordance with the present invention relate to providing a modular column mount 14 of variable angle while minimizing inventory burden.

FIGS. 2A-E are plan, cross-sectional, side, top, and detail views of a column mount 14, in accordance with an embodiment. The column mount 14 comprises a base fixture 20, a clamp float 40, a first ring 50, and a second ring 60. FIGS. 3A-3D are top, front, side, and detail views of the base fixture first half ring 21 of a base fixture 20 in accordance with an embodiment. FIGS. 4A-4D are top, front, side, and detail views of the base fixture second half ring 23 of the base fixture 20 in accordance with an embodiment. The base fixture 20 comprises a base fixture first half ring 21 and a base fixture second half ring 23 defining a base fixture aperture 22 aperture having an inner diameter D1 adapted to accept the clamp float 40 therein. The base fixture first half ring 21 and base fixture second half ring 23 of the base fixture 20 are coupled with suitable fasteners. The base fixture 20 is adapted to be fixably coupled to a structure of a vehicle, such as a floor or wall, with a plurality of suitable fasteners, such as bolts.

Figure 5A:
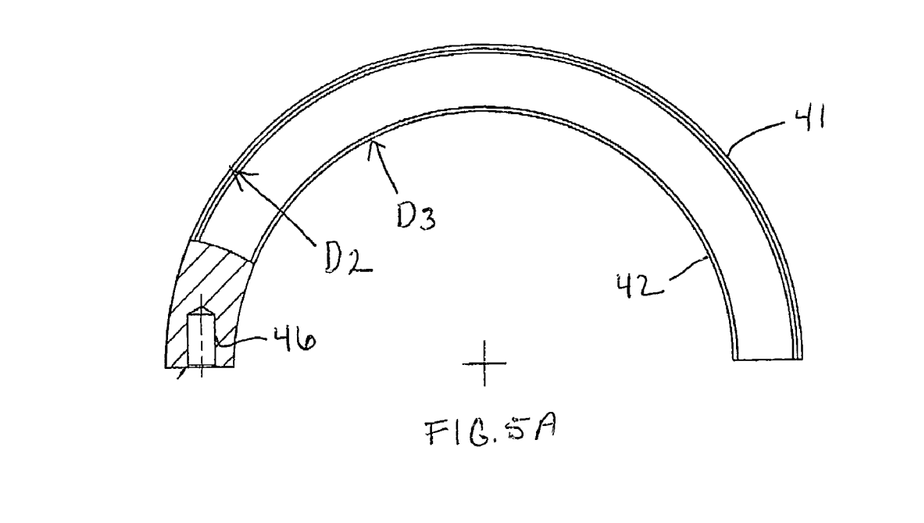
Figure 5B:
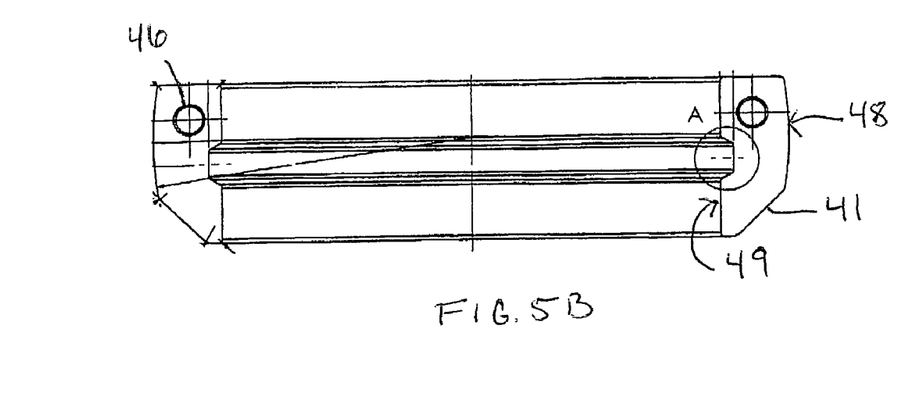
Figure 5D:
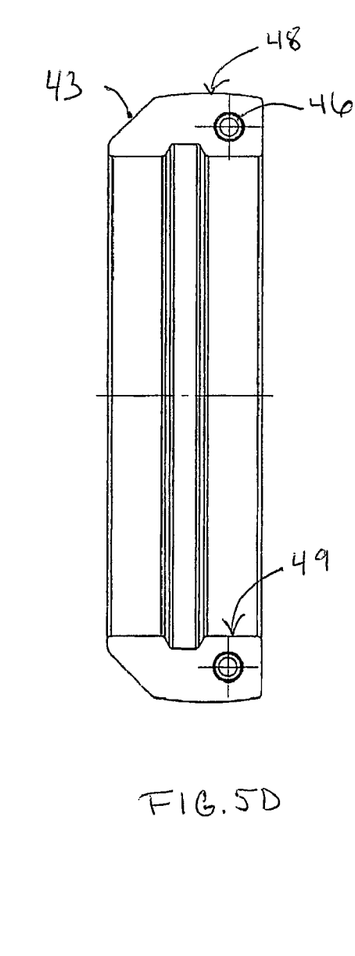
Figure 5E:
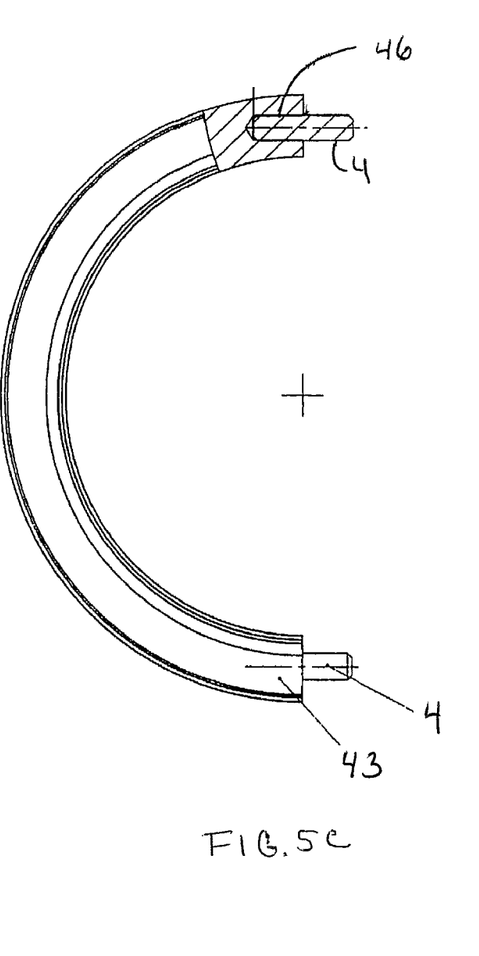

FIGS. 5A and 5B are top and front views of the float first half ring 41 of the clamp float 40 in accordance with an embodiment. The clamp float 40 comprises a float first half ring 41 and a float second half ring 43 having a float outer diameter D2 and defining a float aperture 42 having a float inner diameter D3. The clamp float 40 has a float outer surface 48 that is a convex spherical shape adapted for cooperative engagement with the base fixture inner surface 28 that is a concave spherical surface. The clamp float 40 further comprises a float keyed inner surface 49.

The clamp float 40 is adapted to be captured in the base fixture aperture 22 of the base fixture 20 such that the clamp float 40 may swivel and rotate therein. The amount of swivel is predetermined to accommodate a predetermined amount of axial misalignment of the base mount 14 with the steering column.

Figure 6A:
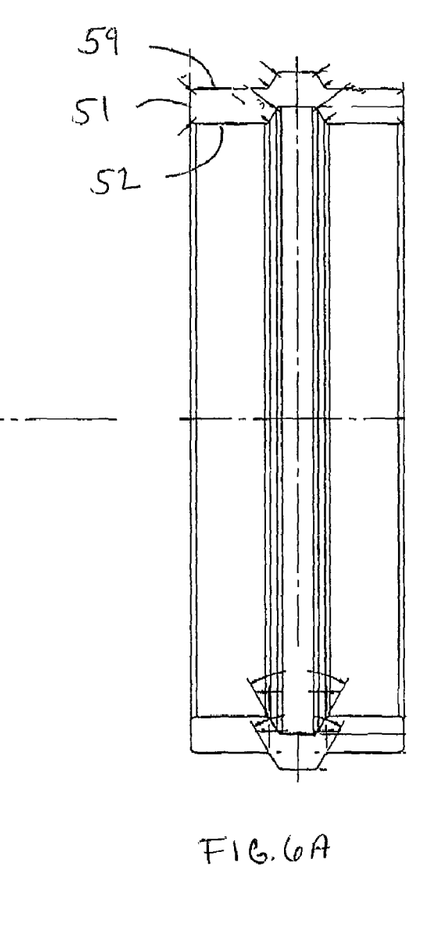
FIGS. 6A and 6B are front and top views of a first ring first half of a first ring in accordance with an embodiment.
Figure 6B:
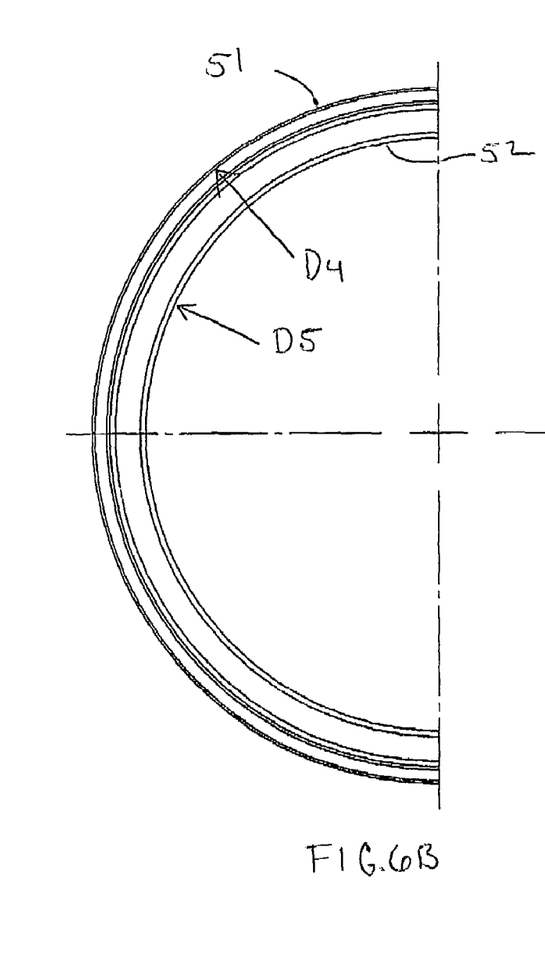

FIGS. 6A and 6B are front and top views of one of the first half ring 51 or second half ring 53 of the first ring 50 in accordance with an embodiment. The first ring 50 comprises a first ring first half 41 and a first ring second half 43 both of which have an outer diameter D4 and defining a first ring aperture 52 having a first ring inner diameter D5. The first ring outer diameter D4 of the first ring 50 has a first ring keyed outer surface 59 adapted for cooperative engagement with the complimentary float keyed inner surface 49 of the clamp float 40.

The first ring 50 is adapted to be captured in the clamp float aperture 42 of the clamp float 40 such that the first ring 50 is held in axial and traverse alignment therein.

Figure 7A:
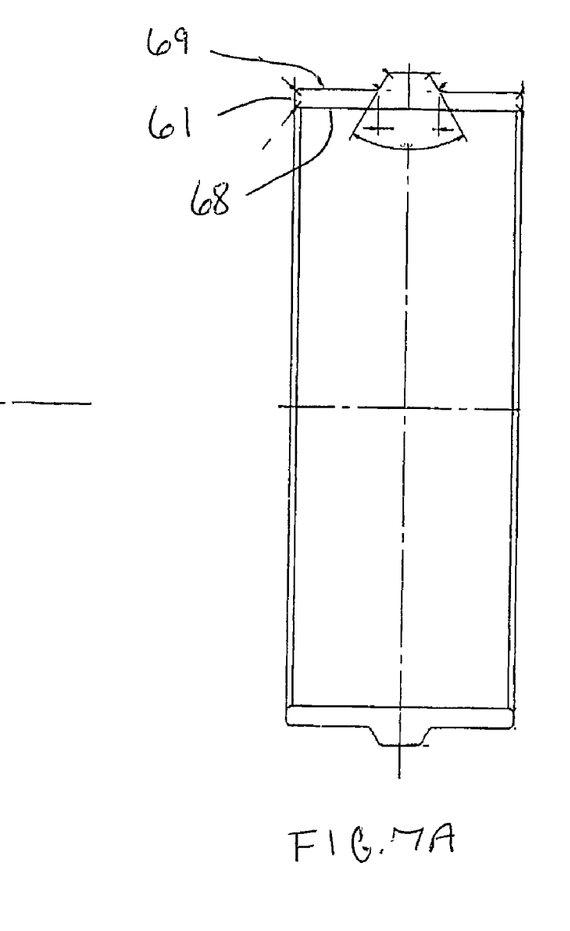
FIGS. 7A and 7B are front and top views of a second ring second half of a second ring in accordance with an embodiment.
Figure 7B:
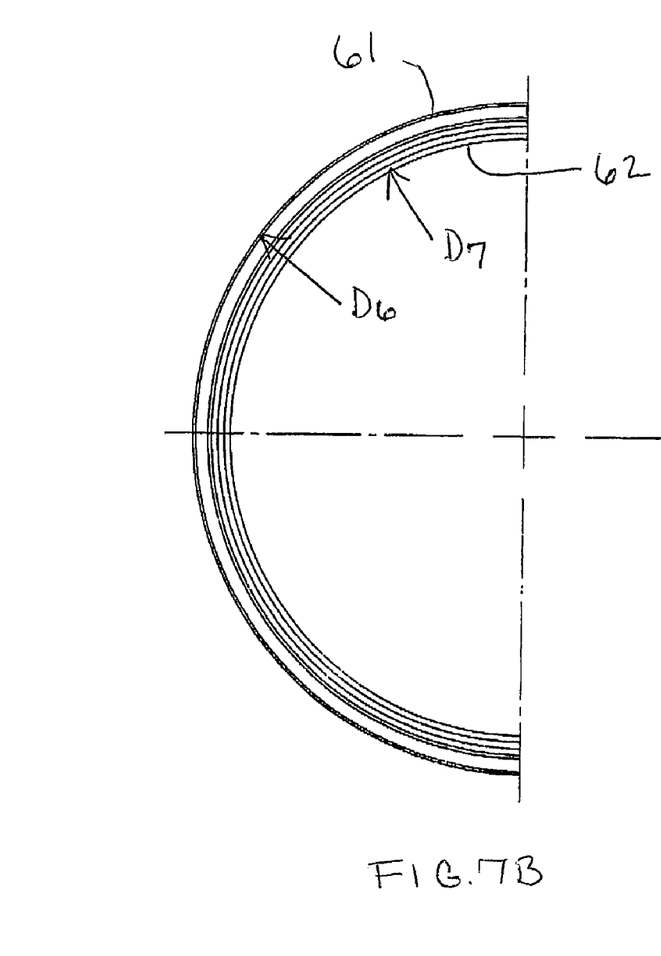

FIGS. 7A and 7B are front and top views of either the second ring first half 61 or the second ring second half 63, 50 in accordance with an embodiment. The second ring 60 comprises a second ring first half 61 and a second ring second half 43 having an outer diameter D6 and defining a second ring aperture 62 having a second ring inner diameter D7. The second ring outer diameter D6 of the second ring 60 has a second ring keyed outer surface 69 adapted for cooperative engagement with the complimentary first ring keyed surface 59 of the first ring aperture 52 of the first ring 50.

The second ring 60 is adapted to be captured in the first ring aperture 52 of the first ring 50 such that the second ring 60 is held in axial and traverse alignment therein.

FIGS. 3A-3D are top, front, side, and detail views of the base fixture first half ring 21 of a base fixture 20 in accordance with an embodiment. FIGS. 4A-4D are top, front, side, and detail views of the base fixture second half ring 23 of the base fixture 20 in accordance with an embodiment. The base fixture first half ring 21 and the base fixture second half ring 23 are adapted to be coupled together to form the base fixture 20 having a base fixture aperture 22 having an inner diameter D1 as provided above. The base fixture second half ring 23 comprises two stepped through-bores 26 for receiving a fastener, such as a bolt, therein. The base fixture first half 21 of the base fixture 20 comprises two threaded bores 27 for complementary engagement with a fastener 2 provided in the threaded bores 27 of the base fixture second half ring 23. The base fixture first and second halve rings are coupled together with suitable fasteners.

Figure 3A:
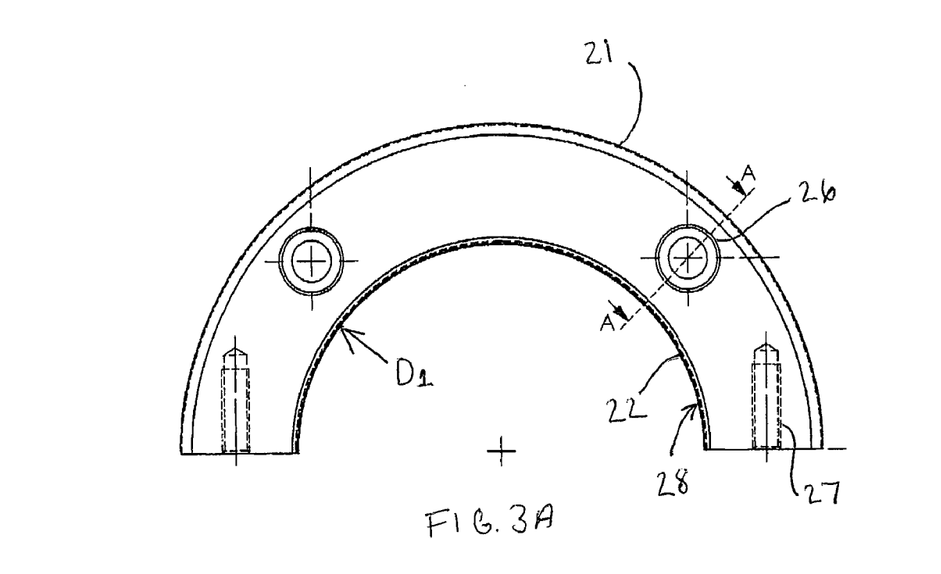
FIGS. 3A-3C are top, front, and detail views of a base fixture first half of a base fixture in accordance with an embodiment.
Figure 3B:
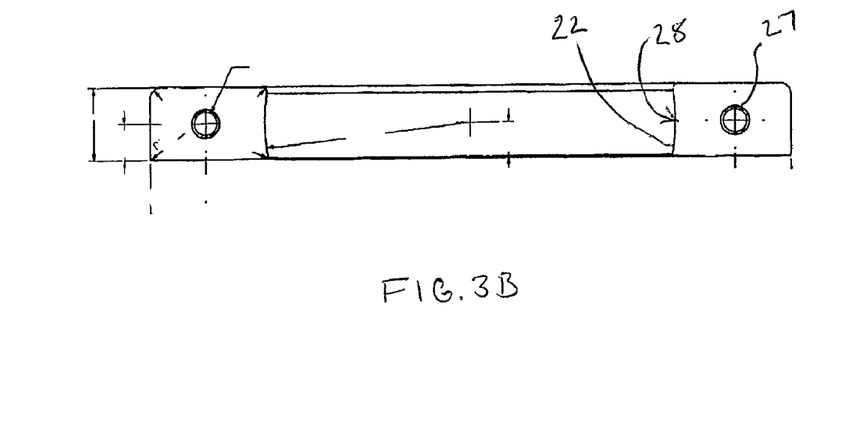
Figure 3C:
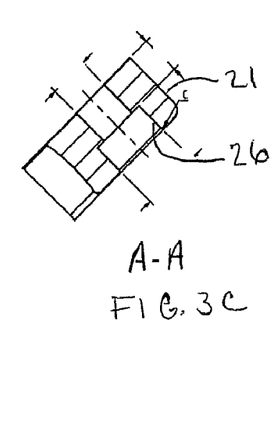
Figure 4A:
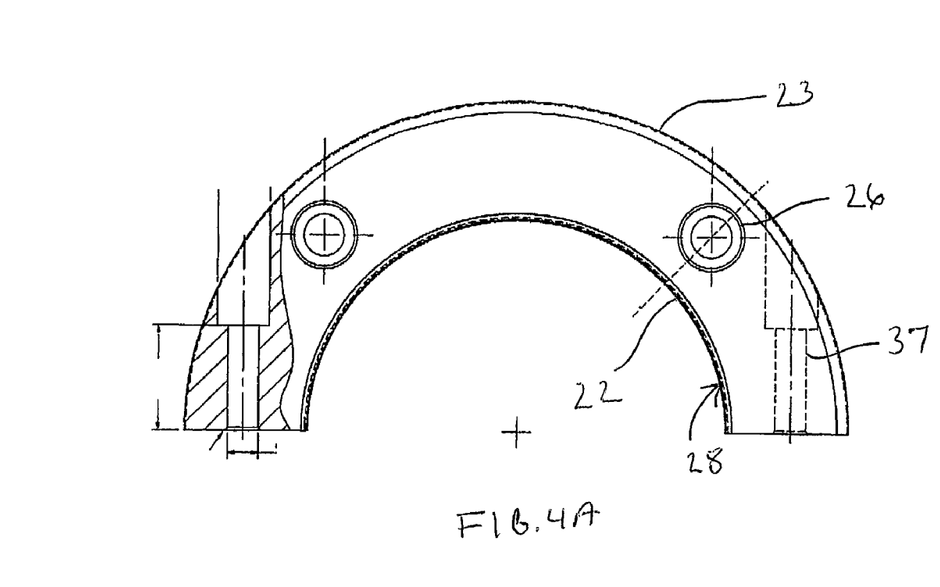
FIGS. 4A and 4B are top and front views of a base fixture second half of a base fixture in accordance with an embodiment of the present invention.
Figure 4B:
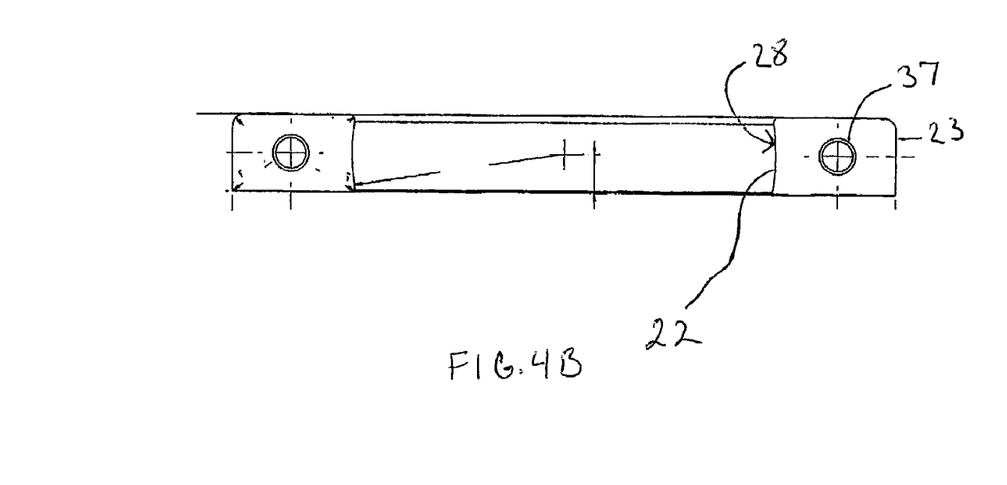

A plurality of base fixture stepped through-bores 26 are disposed through the base fixture first half ring 21 and the base fixture second halve ring 23 of the base fixture 20 for receiving suitable fasteners for coupling to a structure.

The base fixture 20 has a base fixture aperture 22 having an inner diameter D1 of a predetermined dimension. In an embodiment, the predetermined dimension is suitable for snuggly receiving a steering column therein and where axial alignment is not required. The steering column is placed within the base fixture aperture 22 defined by the base fixture first half 21 and the base fixture second half 23 of the base fixture 20 which are then coupled together with suitable fasteners.

It is anticipated that at least some degree of axial misalignment between the structure that the base fixture 20 is coupled to and the steering column. To accommodate axial misalignment, a clamp float 40 is provided.

The clamp float 40 comprises a float first half ring 41 and a float second half ring 43. FIGS. 5A and 5B are top and front views of the float first half ring 41 of the clamp float 40 in accordance with an embodiment. In the present embodiment, float first half ring 41 and a float second half ring 43 are substantially the same. The float first half ring 41 and a float second half ring 43 comprise two float bores 46 for slidingly receiving a pin 4, as shown in FIG. 5C. The float first half ring 41 and a float second half ring 43 are coupled by the engagement of the pins 4 in each of the respective float bores 46. The float first half ring 41 and the float second half ring 43 are retained in the base fixture aperture 22 by the engagement of threaded fasteners coupling the float first half ring 41 and a float second half ring 43.

The float outer diameter D2 of the clamp float 40 comprises a float outer surface 48 that has a spherical convex shape for complementary engagement with the base fixture inner surface 28 with a complimentary spherical concave shape. The cooperative engagement of the float outer surface 48 and the base fixture inner surface 28 with a complimentary spherical concave shape provides for swivel motion relative to the axis of the base fixture 20 to accommodate a predetermined amount of axial misalignment of the base fixture 20 and the steering column.

The clamp float 40 defines a float aperture 42. In an embodiment, the predetermined dimension of the float inner diameter D3 of the clamp float 40 aperture is suitable for snuggly receiving a steering column therein. Axial alignment is provided by the complimentary surfaces of the base fixture inner surface 28 of the base fixture 20 and the float outer surface 48 of the clamp float 40. The steering column is placed within the float aperture 42 defined by the float first half ring 41 and a float second half ring 43, and the clamp float 40 is placed within the base fixture first half ring 21 and base fixture second half ring 23 of the base fixture 20 which are then coupled together with suitable fasteners.

In an embodiment, the float aperture 42 of the clamp float 40 comprises a concave float keyway surface 49 for receiving the smaller diameter first ring 50.

The first ring 50 comprises a first half ring 51 and a second half ring 53 which are complementary and substantially identical. FIGS. 6A and 6B are front and top views of the first half ring 51 or second half ring 53 of the first ring 50 in accordance with an embodiment. The first half ring 51 and second half ring 53 are retained within the float aperture 42 of the clamp float 40 by the engagement of the base fixture 20 with the clamp float 40; that is, by the threaded fasteners coupling the base fixture first half ring 21 and the base fixture second half ring 23.

The first ring outer diameter D4 of the first ring 50 comprises a first ring outer surface 59 that is a convex keyway for complementary engagement with a concave keyway of the clamp float inner surface 49 of the clamp float 40.

The first ring 50 defines the first ring aperture 52. In an embodiment, the predetermined dimension of the first ring inner diameter D5 of the first ring aperture 52 of the first ring 50 is suitable for snuggly receiving a steering column therein. Axial alignment is provided by the complimentary surfaces of the base fixture inner surface 28 of the base fixture 20 and the float outer surface 48 of the clamp float 40. The steering column is placed within the first half ring aperture 52 defined by the first half ring 51 and second half ring 53, which are themselves placed within the float aperture 42 defined by the float first half ring 41 and a float second half ring 43, and the clamp float 40 is placed within the base fixture aperture 22 defined by the base fixture first half ring 21 and base fixture second half ring 23 of the base fixture 20 which are then coupled together with suitable fasteners.

In another embodiment of the first ring 50, the first ring 50 is provided as a solid ring suitable for receiving a steering column therethrough, rather than as a first half ring 51 and second half ring 53.

In an embodiment, the first ring aperture 52 of the first ring 50 comprises a first ring inner surface 52 that has a concave keyway shape for receiving the smaller diameter second ring 60.

The second ring 60 comprises a second ring first half 61 and a second ring second half 63 which are complementary and substantially identical, in accordance with an embodiment. FIGS. 7A and 7B are front and top views of either the second ring first half 61 or the second ring second half 63. The second ring first half 61 and a second ring second half 63 of the second ring 60 are retained in the first half ring 51 and second half ring 53 of the first ring 50, which are retained within the float aperture 42 of the clamp float 40 by the engagement of the base fixture 20 with the clamp float 40; that is, by the threaded fasteners coupling the base fixture first half ring 21 and base fixture second half ring 23 of the base fixture 20.

The second ring outer surface 69 of the second ring 60 comprises a convex keyway shape for complementary engagement with the concave keyway shape of the first ring aperture 52 of the first ring 50.

The second ring 60 defines a second ring aperture 62. In an embodiment, the predetermined dimension of the second ring inner diameter of the second ring 60 is suitable for snuggly receiving a steering column therein. Axial alignment of the second ring 60 with the base fixture 20 is provided by the complimentary surfaces of the first ring inner surface 52 of the first ring 50 and the second ring outer surface 69 of the second ring 60. The steering column is placed within the second half ring aperture 62 defined by the second ring first half ring 61 and the second ring second half ring 63, with themselves are placed within the float aperture 42 defined by the float first half ring 41 and a float second half ring 43, and the clamp float 40 is placed within the base fixture aperture 22 defined by the base fixture first half ring 21 and base fixture second half ring 23 of the base fixture 20 which are then coupled together with suitable fasteners.

In another embodiment of the second ring 60, the second ring 60 is provided as a solid ring suitable for receiving a steering column therethrough, rather than a second ring first half ring 61 and a second ring second half ring 63.

The second ring aperture 62 of the second ring 60 comprises a second ring inner surface 68 that is a smooth cylindrical surface suitable for engagement with the steering column.

The modularity of the column mount 14 in accordance to embodiments herein is provided by the engagement of one or more rings, such as the first ring 50 and the second ring 60. In the embodiment of FIG. 2, the column mount 14 can accommodate various steering columns having a diameter of the second ring aperture 62 of the second ring 60, the first ring aperture 52 of the first ring 50, the float aperture 42 of the clamp float 40, or the base fixture aperture 22 of the base fixture 20. In other embodiments, rings of various aperture are provided to accommodate various diameters of the steering columns.

In other embodiments, a single ring having a second ring inner diameter D7 of the second ring aperture 62 of the second ring 60 and a first ring outer diameter D4 of the first ring 50 is provided rather than a first and second ring 60.

In other embodiments of the present invention, the rings are bushings adapted to accept a steering column of predetermined diameter. Bushings are anticipated having one of a plurality of apertures having an inner diameter to accommodate the various diameters of the steering column.

The base fixture 20 is removably coupled to a structure on a vehicle. In an embodiment, the base fixture 20 further comprises threaded rods 3 extending from the base fixture 20 to facilitate coupling to a structure of a vehicle with threaded fasteners. Other coupling elements besides threaded rods, such as, but not limited to, threaded bores and through-bores, are anticipated and are within the scope of the invention.

The modular column mount 14 in accordance with embodiments, by virtue of comprising modular elements in the form of a base fixture 20, a clamp float 40, first rings 50 and a second ring 60 of various aperture diameters, allows for modularizing the column mount 14 suitable for particular purposes. For example, but not limited thereto, various rings can be used to adapt the aperture of the column mount 14 to a steering column. Further, but not limited thereto, rings having one of many aperture sizes can be fitted or retrofitted onto the base fixture 20.

It is understood and appreciated that modular column mount 14, in accordance with embodiments, can be provided having apertures suitable for a particular purpose by providing rings of various aperture diameters. The user is no longer limited to a few non-adjustable standard aperture diameters of column mounts or to custom-made column mounts, but can now be provided with a column mount of many aperture sizes by the addition of one or more rings. Rings of different predetermined aperture diameters may be mixed and matched so as to provide various combinations providing a column mount to meet most customer's needs. The cost of manufacturing and inventory control of various rings is substantially less than the cost of manufacturing and inventory control of column mounts of fixed aperture size in all the various aperture sizes that are possible and provided by the modular column mount.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A column mount comprising:
a base fixture defining a base fixture aperture;
a clamp float defining a float aperture, the clamp float in engagement with the base fixture within the base fixture aperture;
a first ring in engagement with the clamp float within the float aperture, the first ring defining a first ring aperture; and
a second ring in engagement with the first ring within the first ring aperture;
wherein the base fixture comprises a base fixture first half ring and a base fixture second half ring defining the base fixture aperture having a base fixture inner surface defining an inner diameter operable to accept the clamp float therein, the base fixture first half ring and the base fixture second half ring being coupled,
the clamp float including a float first half ring and a float second half ring defining a float outer diameter and defining the float aperture defining a float inner diameter, the float first half ring and the float second half ring being coupled, the clamp float having a float outer surface that is operable for cooperative engagement with the base fixture inner surface, the clamp float further comprising a float inner surface, the clamp float operable to be captured in the base fixture aperture such that the clamp float may swivel and rotate therein,
the first ring comprising a first ring first half and a first ring second half being coupled and defining a first ring outer surface defining a first ring outer diameter and defining the first ring aperture defining a first ring inner diameter, the first ring outer surface operable for cooperative engagement with the float inner surface of the clamp float, the first ring operable to be captured in the clamp float aperture such that the first ring is held in axial and traverse alignment therein,
the second ring comprising a second ring first half and a second ring second half being coupled defining a second ring outer surface defining a second ring outer diameter and defining a second ring aperture defining a second ring inner diameter, the second ring outer surface is operable for cooperative engagement with the first ring inner surface, the second ring operable to be captured in the first ring aperture such that the second ring is held in axial and traverse alignment therein, wherein the float first half ring and the float second half ring are retained in the base fixture aperture by the engagement of fasteners operable for coupling the base fixture first half ring and the base fixture second half ring, wherein the float inner surface has a keyway shape for complementary engagement with the first ring outer surface having a complimentary keyway shape.

2. The column mount of claim 1, wherein the float outer surface has a spherical convex shape for complementary engagement with the base fixture inner surface having a complimentary spherical concave shape.

3. The column mount of claim 1, wherein the first ring outer surface has a convex keyway shape for complementary engagement with the clamp float inner surface having a complementary concave keyway shape.

4. The column mount of claim 3 wherein the second ring outer surface has a convex keyway shape for complementary engagement with the first ring inner surface having a complementary concave keyway shape.

5. A column mount comprising:
a base fixture;
a clamp float;
a first ring; and
a second ring, the base fixture including a base fixture first half ring and a base fixture second half ring defining a base fixture aperture having a base fixture inner surface defining an inner diameter operable to accept the clamp float therein, the base fixture first half ring and base fixture second half ring operable to be coupled, the clamp float including a float first half ring and a float second half ring defining a float outer diameter and defining a float aperture defining a float inner diameter, the clamp float having a float outer surface that is operable for cooperative engagement with the base fixture inner surface, the clamp float further comprising a float inner surface, the clamp float operable to be captured in the base fixture aperture such that the clamp float may swivel and rotate therein, the first ring comprising a first ring first half and a first ring second half defining a first ring outer surface defining a first ring outer diameter and defining a first ring aperture defining a first ring inner diameter, the first ring outer surface operable for cooperative engagement with the float inner surface, the first ring operable to be captured in the clamp float aperture such that the first ring is held in axial and traverse alignment therein, the second ring comprising a second ring first half and a second ring second half defining a second ring outer surface defining a second ring outer diameter and defining a second ring aperture defining a second ring inner diameter, the second ring outer surface operable for cooperative engagement with the first ring inner surface, the second ring operable to be captured in the first ring aperture such that the second ring is held in axial and traverse alignment therein, wherein the float first half ring and the float second half ring are retained in the base fixture aperture by the engagement of fasteners operable for coupling the base fixture first half ring and the base fixture second half ring, wherein the float inner surface has a keyway shape for complementary engagement with the first ring outer surface having a complimentary keyway shape.

6. The column mount of claim 5, wherein the float outer surface has a spherical convex shape for complementary engagement with the base fixture inner surface having a complimentary spherical concave shape.

7. The column mount of claim 5, wherein the first ring outer surface has a convex keyway shape for complementary engagement with the clamp float inner surface having a complementary concave keyway shape.

8. The column mount of claim 7, wherein the second ring outer surface has a convex keyway shape for complementary engagement with the first ring inner surface having a complementary concave keyway shape.

\* \* \* \* \*